US008793164B2

(12) United States Patent
Sendo et al.

(10) Patent No.: US 8,793,164 B2
(45) Date of Patent: Jul. 29, 2014

(54) SYSTEM AND METHOD ENABLING CHILDREN TO SHOP ON-LINE

(76) Inventors: Mark Sendo, Ann Arbor, MI (US); Brian Ferrilla, Troy, MI (US)

( * ) Notice: Subject to any disclaimer, the term of this patent is extended or adjusted under 35 U.S.C. 154(b) by 1372 days.

(21) Appl. No.: 11/767,793

(22) Filed: Jun. 25, 2007

(65) Prior Publication Data

US 2008/0004984 A1    Jan. 3, 2008

Related U.S. Application Data

(60) Provisional application No. 60/816,269, filed on Jun. 23, 2006.

(51) Int. Cl.
*G06Q 30/00*    (2012.01)

(52) U.S. Cl.
USPC ................. 705/26.41; 705/27.1; 705/26.1

(58) Field of Classification Search
USPC ..................................... 705/26, 27
See application file for complete search history.

(56) References Cited

U.S. PATENT DOCUMENTS

| 5,845,260 | A | 12/1998 | Nakano et al. | |
| 6,173,269 | B1 | 1/2001 | Solokl et al. | |
| 6,505,171 | B1 * | 1/2003 | Cohen et al. | 705/26.41 |
| 7,006,993 | B1 * | 2/2006 | Cheong et al. | 705/38 |
| 7,203,656 | B2 | 4/2007 | Lotvin et al. | |
| 2002/0133378 | A1 * | 9/2002 | Mault et al. | 705/3 |
| 2004/0143512 | A1 * | 7/2004 | Sturr, Jr. | 705/26 |
| 2006/0074808 | A1 * | 4/2006 | Boesen | 705/51 |
| 2007/0027776 | A1 * | 2/2007 | Farrow | 705/26 |

OTHER PUBLICATIONS iCanBuy: "Internet Marketers Offer Kids Online Sales Access," Card Marketing, Jun 1999, v3n6p1; Dialog file 9 #01882956, 3pgs.*
Cybermoola: "Teen Buyers Now Have New Ways to Pay Online," Computerworld, Oct. 25, 1999, v33n43p40; Dialog file 15 #01950645, 3pgs.*

(Continued)

*Primary Examiner* — Rob Pond
(74) *Attorney, Agent, or Firm* — Gifford, Krass, Sprinkle, Anderson & Citkowski, P.C.

(57) ABSTRACT

A system and method enabling people, including children, to shop on-line in a safe and secure manner. A gift card having a predetermined monetary value is purchased by a parent, friend or other third party. An account is established in conjunction with a web site with a starting account balance related to the predetermined monetary value. As a user shops at the web site, their account balance is reduced as items are purchased. One or more filters are used to limit the types of products that can be purchased on the web site. Such filters may relate to a user's age, gender, hobbies or interests, price range, media maturity rating, and so forth. In the preferred embodiment, consent information is received in conjunction the COPPA (Child Online Privacy Protection Act) or other applicable law(s). The consent information includes usage options, opt-out provisions, child master records information, etc. The method further includes the step of funding the account by a third party. In the preferred embodiment the initial and subsequent funding, as well as the purchase prices for goods/services are in a whole dollar amounts to simplify buying. A desktop icon is preferably provided that allows access to the web site through a single click, and/or graphically indicates a user's available funds. The system may further allow a user to purchase music, video, games or other media through a source other than the web site.

16 Claims, 3 Drawing Sheets

(56) References Cited

OTHER PUBLICATIONS

Melia, Marilyn Kennedy; "Kids get Freedom to spend, but Parents Keep Control," Chicago Tribune Feb. 20, 2001, PQDialog #419278416, 3pgs.*

Hoffman, Karen Epper; "Cards for Teens Are 'In' Thing: A youngster's buying power is being targeted by card companies," Bank Technology News, Apr. 2001; PQDialog #72680682, 3pgs.*

* cited by examiner

SYSTEM AND METHOD ENABLING CHILDREN TO SHOP ON-LINE

REFERENCE TO RELATED APPLICATION

This application claims priority from U.S. Provisional Patent Application Ser. No. 60/816,269, filed Jun. 23, 2006, the entire content of which is incorporated herein by reference.

FIELD OF THE INVENTION

This invention relates generally to electronic commerce and, in particular, to a system and method providing a personalized, safe and secure environment enabling children to shop on-line.

BACKGROUND OF THE INVENTION

The Internet has accelerated "age compression," and American children have more sophisticated consumer tastes than those of past generations. Children experience more independence than ever before, which includes individual shopping habits. It has been estimated that more than two-thirds of all teens, and more than one-third of children between the ages of five and 12, have now purchased or researched products on the Internet. American youth aged five and older spend billions of dollars each year purchasing consumer goods online.

Since advertisers believe many brand preferences are set by age 12, merchandisers are anxiously probing this market and devising new methods to tap its potential. Growth in this space is hampered, however, because children cannot use credit cards or payment mechanism requiring a credit card as back-up. While some Internet vendors offer Web-only debit cards to teens, these are limited to goods purchased at an affiliated-Web site.

Of course, parents worry about allowing their children to shop online. Concern includes their inability to supervise online purchases, financial responsibility, direct marketing and privacy. In the late 1990s various Wed sites emerged with "digital wallets" funded by a specified cash amount that draws, much like debit cards, on a savings account to prevent children from overspending. Other sites permitted parents to stipulate where kids can shop.

Sites such as ICanBuy, RocketCash, Cybermoola, and DoughNET let parents set up accounts for their kids with a credit card, cash or money order. Parents can set spending limits and keep track of what's being purchased. These and other sites positioned themselves as environments where kids can learn to manage money and credit. Unfortunately, most of these sites closed due to the "dot-com crash" that came a few years after the sites opened.

Several patents have also issued that allow children to shop online. The environment disclosed in U.S. Pat. No. 5,845,260, for example, enables a child to receive a desired on-line service on the basis of his own judgment by setting an upper limit to utilizable services. A predetermined service is provided from a server to user terminals via a transmission medium. A fee for such service is collected from each user individually. The fee collection includes the steps of opening, in the server, an imaginary account for a child of the relevant user with a limited maximum amount, and withdrawing from the imaginary account the fee for the service provided to the user's child. The server can provide a predetermined service to the relevant user's child within a range of the limited maximum amount preset in the imaginary account. When withdrawing the fee from the imaginary account, the server can restrict the service providable to the terminal. Thus, the parent enables his child to receive a desired on-line service, such as on-line shopping or video-on-demand, without concern for over-spending.

U.S. Pat. No. 6,173,269, for example, teaches a method and apparatus for executing electronic transactions with teens, especially where such transactions are limited only to those vendors that have been approved by the teen's parents. In one embodiment, a virtual automatic teller machine (VATM) is provided in which funds are transferred from an existing account, such as a saving account, checking account, or credit card account, to an Internet passport account. The VATM account mimics a bank account, i.e. it gives the user the appearance of an ATM machine. Functionally, the VATM allows the user to transfer funds from an existing account into the Internet passport account. The VATM does this by emulating an ATM machine as it appears to the Automated Clearing House (ACH) system. The ACH system is a separate network from the Internet. Rather than acting as a trustee for a teen account, the invention provides a method and apparatus that allows a merchant to withdraw funds directly from the teen's account automatically.

According to U.S. Pat. No. 7,203,656, educational material is provided at a child's local computer. On completing a particular educational task, a child is rewarded with points that are accumulated and stored. The points can be redeemed towards the purchase of goods and services offered through the system by commercial participants. For example, the child may order goods and services by selecting from menus presented by the central computer, which, in turn, orders the selected items by telephone, e-mail, mail, or otherwise from a vendor or distributor for delivery. The central computer may also send a message to the local computer to print out certificates redeemable at participating vendors of goods and services. Also, points may be redeemed by downloading requested goods available in digital electronic form, such as software, games, music, and video. It is preferred that the offered goods and services be items desirable by the children so that the prospect of obtaining these items is a motivation for the children to diligently pursue the educational materials available in the system.

Parents have their own way of accessing the system of the '656 patent through their own, usually different, password. Parents preferably use the system for several purposes. First, parents support their children's purchasing activity financially. Preferably, the parent authorizes the system to periodically (e.g. monthly) allow purchases to be made through the redemption of the child's points, up to a certain limit, using the parents' credit card account, or other payment arrangements (e.g., though the use of electronic cash or direct account withdrawal). The parent can also authorize a system-initiated increase in the purchasing power of the child—a "bonus—for example, thereby permitting certain advertising messages to be displayed to the child as the child uses the system.

SUMMARY OF THE INVENTION

This invention resides in a system and method enabling people, including children, to shop on-line in a safe and secure manner. The method aspect begins with the step of providing a web site with products for purchase. A gift card having a predetermined monetary value to be used only at the web site is purchased by a parent, friend or other third party. An account is established in conjunction with the web site with a starting account balance related to the predetermined monetary value. As a user shops at the web site, their account balance is reduced as items are purchased.

In the preferred embodiment one or more filters are used to limit the types of products that can be purchased on the web site. Such filters may relate to a user's age, gender, hobbies or interests, price range, media maturity rating, and so forth. In the preferred embodiment, consent information is received in conjunction the COPPA (Child Online Privacy Protection Act) or other applicable law(s). The consent information includes usage options, opt-out provisions, child master records information, etc.

The method further includes the step of funding the account by a third party. In the preferred embodiment the initial and subsequent funding, as well as the purchase prices for goods/services are in a whole dollar amounts to simplify buying. A desktop icon is preferably provided that allows access to the web site through a single click, and/or graphically indicates a user's available funds.

The system may further allow a user to purchase music, video, games or other media through a source other than the web site. For example, such media may be purchased through a satellite radio service by way of a predefined key sequence establishing a service-level agreement (SLA) contract. In this embodiment, the SLA is established through the key sequence in conjunction with the time the sequence was entered, the channel number, and an identification code. The media is preferably automatically placed into a music library for subsequent access by the purchaser.

DETAILED DESCRIPTION OF THE INVENTION

Figure 1:
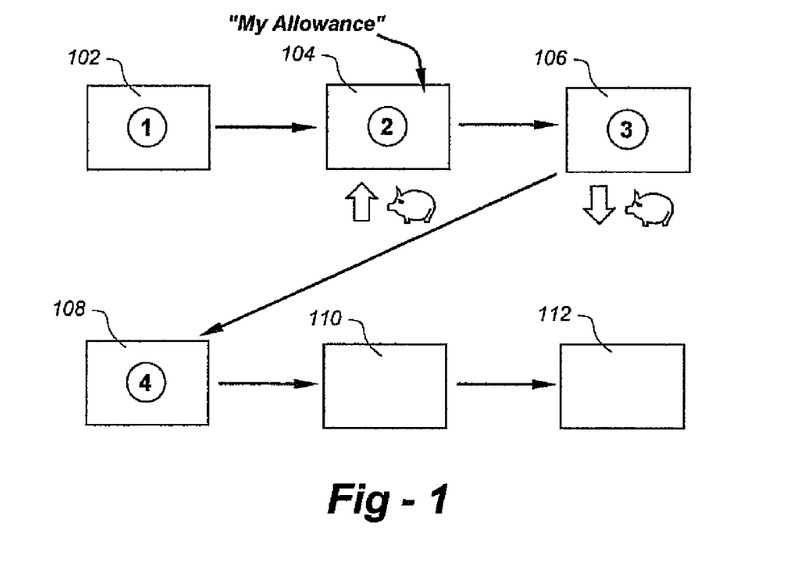
FIG. 1 provides an overview of activities associated with the invention.

FIG. 1 provides an overview of activities associated with the invention. At step 102, parents purchase a prepaid "KidsCash" gift card (e.g., in $25, $50, etc. denominations, etc.) at any one of many nationally recognized retailers. Although the currently preferred name for the system is "KidsCash," the invention is not limited in terms of the name used. Although it is expected that a parent will purchase the card, as used herein "parent" should be taken to include relatives, friends, guardians and loved ones. New accounts may also be initiated directly at one or more web sites (e.g., "KidsCash.com").

Using the KidsCash prepaid card, parents help their child activate their KidsCash account at KidsCash.com as shown at 104. At this site, users create a personalized, safe, secure, online experience that is unique to their child's interests, gender, and age level. Parents give their child access to an assortment of products based on the parent's own level of comfort with the product categories, product ratings, and products themselves. In addition, KidsCash.com teaches the parents how the KidsCash process works.

Children can securely log into the KidsCash.com website as often as they wish and shop there, as shown at 106. In the preferred embodiment, KidsCash products are presented with one simple flat dollar amount including tax and shipping to simplify the purchase planning and completion process. They can monitor the contents of their "piggy bank" 120 at all times while they are shopping and confirming purchases. They can also learn about shopping and transacting via numerous games and educational interactions throughout the KidsCash.com experience.

Once a child submits an order, KidsCash.com facilitates the fulfillment process through the merchandiser on a "behind-the-scenes" basis at 108. The child's KidsCash "piggy bank" (i.e. account) is decremented accordingly and they can continue shopping. In addition, the parent is notified via email that their child has ordered a product so they can be on the look out for its arrival at home (110 and 112). Further details about the "piggy bank" icon are presented herein below.

Once the child's KidsCash account is depleted, parents will be able to further "fund" the account via the KidsCash.com website with their VISA or MC debit card, PayPal account, or other on-line payment source. Using the concept of "online allowances," (114) this funding can be automatic or can be contingent on the completion of chores by the child or other desired conditions as "checked off" by the child in KidsCash.com.

Interested persons will be able to "fund" KidsCash accounts to provide a unique gift for special occasions to their favorite child. Loved ones can always purchase additional KidsCash prepaid gift cards or, for a more convenient gift-giving experience, they can send a "KidsCash-O-Gram" which can fund the child's KidsCash account electronically. Parents are always notified of any activity on their child's account and are allowed to make these "reloads" available to their child. Parents and their children will be able to use their mobile phones to access the KidsCash experience including: access account information, "fund" their account, and eventually make purchases.

As a premier financial educational resource for children, KidsCash.com allows kids to manage their own online "piggy bank" and actually bank a portion of their KidsCash into a savings account of their parent's choice. This helps to complete a child's exposure to the concepts of spending and saving as lifelong skills.

Figure 2:
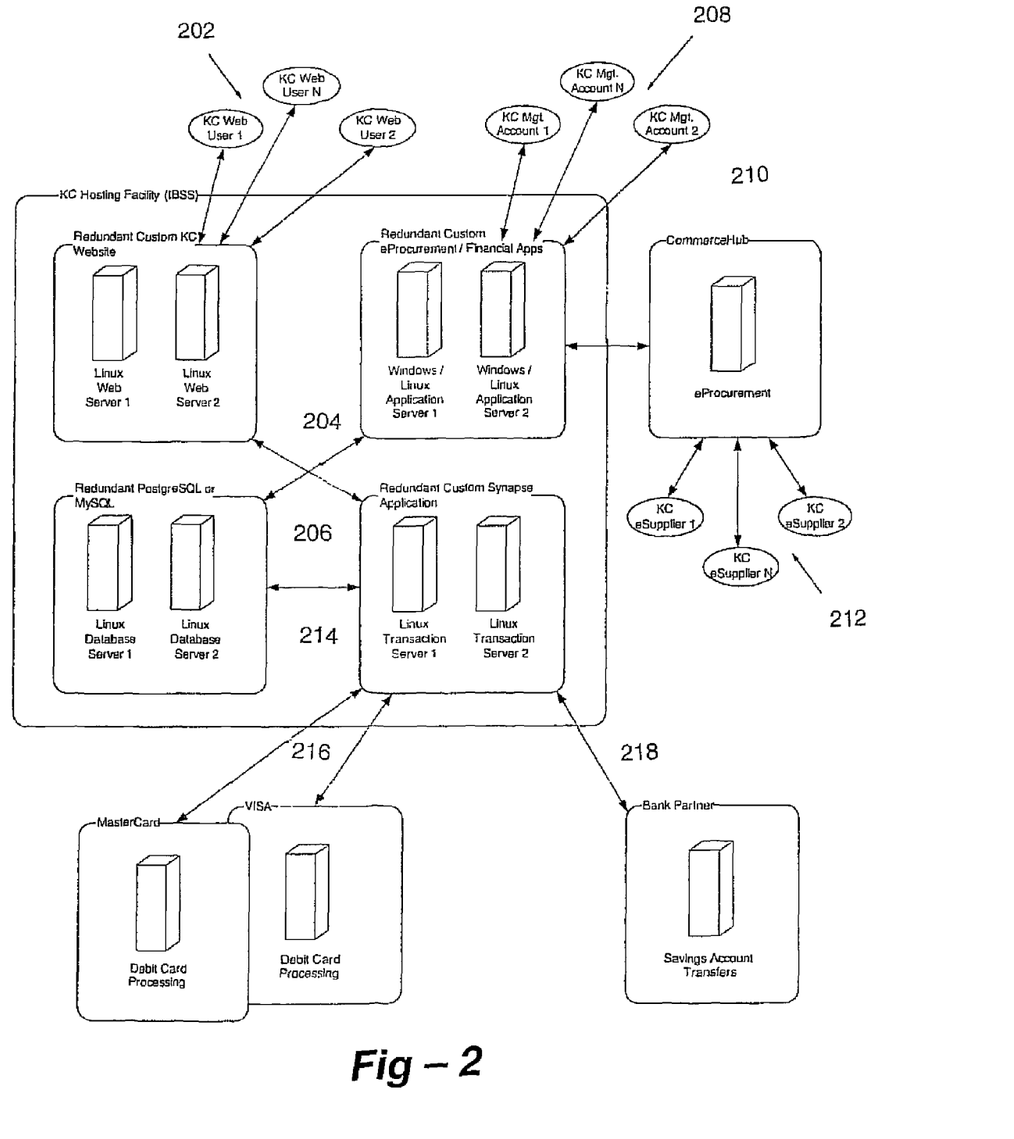
FIG. 2 shows a Network Architecture Schematic for a preferred embodiment of the invention.

FIG. 2 shows a Network Architecture Schematic for the KidsCash system. The Web Browser Interface 202 facilitates access to the KidsCash application through industry standard Internet web browsers such as Microsoft IE, Netscape, Firefox. Connection security via Public Internet transport requires a User ID, password, and optional secret question to gain access. This preferably creates an HTTPS (secure socket) session based upon the TCP/IP protocol.

One form of Application to Application Communication is provided at 204, where a Web Services layer is used for communication with the KidsCash Transaction Servers via TCP/IP. The Web Services are offered to the other applications via SOAP 1.2 or other messaging protocol. Again, for security purposes, authentication will preferably be conducted with a chosen token format, such as a credentials token to generate authorization tokens. Signatures will be provided with a chosen format; for example, by requiring each transaction document to include a digital signature in the SOAP header (XML-DSIG). Encryption will be provided as desired through session keys, SSL or private keys.

Another Application to Application Communication is depicted at 206, where the Web Services layer is used for communication with the database transaction servers via TCP/IP. Again, the Web Services are offered to the other applications via SOAP 1.2 or other framework. Authentication will preferably be conducted with a chosen token format such as a credentials token to generate authorization tokens. Signatures will be provided with a chosen format; for example, by requiring each transaction document to include a digital signature in the SOAP header (L-DSIG). Encryption will be provided as desired through session keys, SSL or private keys.

The Web Browser Interfaces 208 facilitates access to the business management applications via industry standard Internet web browsers based upon TCP/IP. Industry standard web browser connection security is provided requiring user ID and password for access. This creates an HTTPS session or establishes a secure VPN connection.

A Web Services layer 210 will also be used for the eProcurement server transactions via TCP/IP. Security will be treated as based on operation in the public domain, and encryption will be done with a chosen technology, like sessions keys SSL or private keys. Communication may be handled in various ways, depending on the data load. Initially, when the load is light, a VPN may be established between the KidsCash site and CommerceHub (typically a secure tunnel between firewalls). If load is sufficiently high, a dedicated line may be established between the two sites.

Web connections (HTTPS) 212 enable suppliers to log in and use the various eProcurement applications; FTP, web, or other connectivity provided for suppliers to load and update data.

Communication with the Database is done at 214 with the a Secure TCP/IP connection with SSL.

TCP/IP protocol. Communication to the Financial Processing Providers is handled at 216 as regulated by the selected financial services provider and the associated card association and ACH Regulation e-rules. Communication with Bank Partner(s) 218 is depicted at 218. Each financial services provider gives KidsCash their respective preferred interface specifications necessary to work with their service. This interface specification will dictate protocols, formats, procedures, networks, and security.

The KidsCash Proprietary Transaction Server isolates interface-unique rules to a single location. This allows the application to be independent of a given financial service provider, while adding the necessary application-specific logic to the customer controlled fields within the service providers end user controlled fields within their standard transaction formats used to process and settle financial transactions.

The KidsCash Proprietary Transaction Server is able to configure any selected financial services providers' specified interface specification and match any security requirements plus encryption requested. Use of the KidsCash Proprietary Transaction Server is significant due to its scalability and its flexibility to keep up with this most dynamic area of the design.

Parent User Log-on

Figure 3:
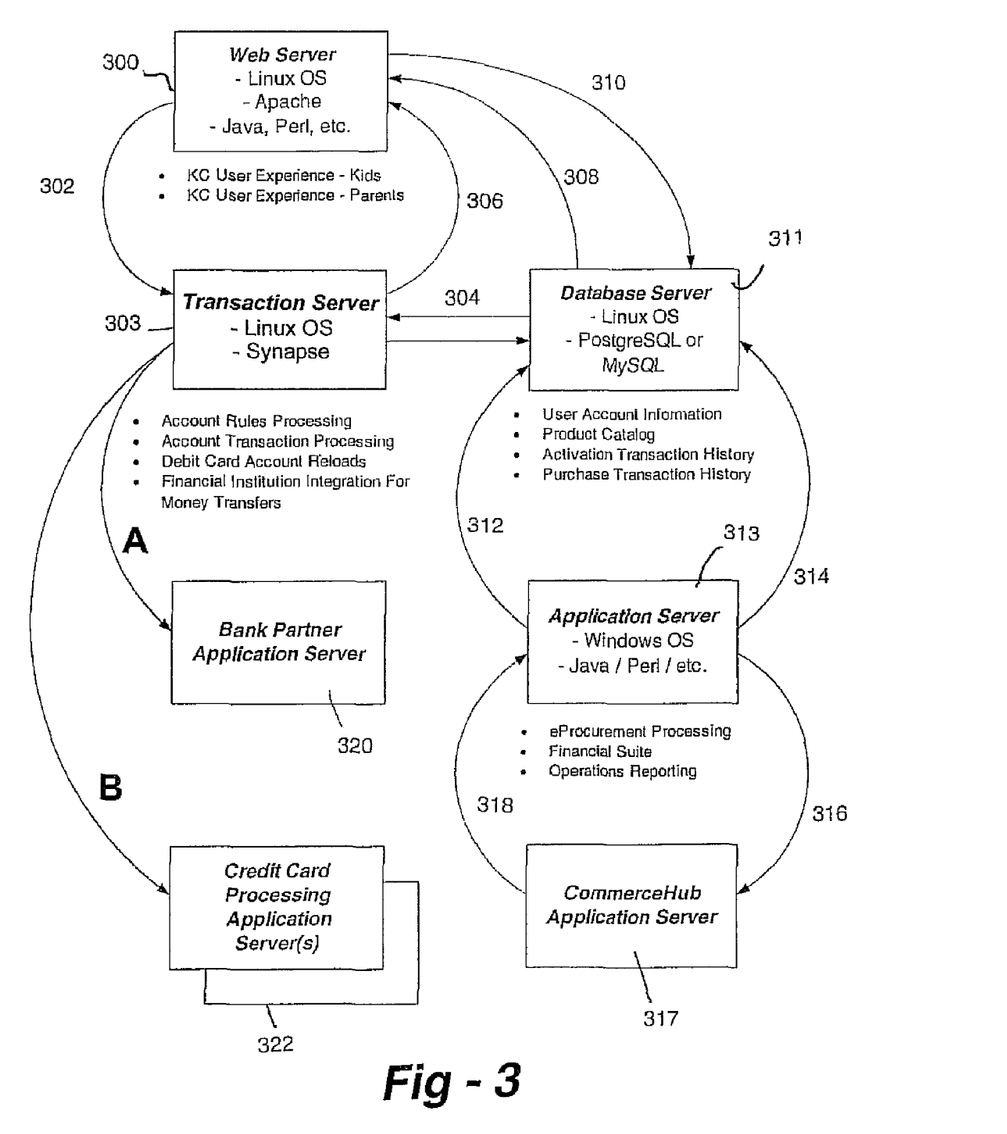
FIG. 3 is a simplified Application Architecture Schematic.

The parent user logs in with a user ID and password to initiate a web server (300) secure session via web browser as shown in the Application Architecture Schematic of FIG. 3. User experience is presented using Java, HTML, Flash, Perl applications.

The web server initiates communication to KidsCash Proprietary Transaction Server 305 at 302 to initiate the account retrieval (existing parent) or account registration process (new parent). Account retrieval includes the following:
  Child master records information including logins (ID, password, secret question) KidsCash account balance, savings account balance
  Parental product category assortments for children
  Products for purchase/content filter attributes for each child based on age, gender, interests, product types, price range, maturity ratings, etc.
  Desired shipping information for product delivery
  Allowance rates and success requirements for each child
  KidsCash Savings account attributes
  Account replenishment VISA/MC/checking account information The web server initiates communication to KidsCash Proprietary Transaction Server to initiate the COPPA (Child Online Privacy Protection Act) consent retrieval process. Consent retrieval includes:
  Parental permissions for each child with embedded COPPA (Child Online Privacy Protection Act) requirements including parental consent for child to transact per the parent's product/content filtering preferences for each child
  Information usage options and opt out
  Privacy policy accepted by parents when account was created
  Child master records information
Child User Log-on The child user logs in with a user ID, password, and optional secret question to initiate a web server (300) secure session via web browser, as shown in the Application Architecture Schematic of FIG. 3. User experience is again presented using Java, HTML, Flash, Perl applications.

The Web server initiates communication to KidsCash Proprietary Transaction Server 303 to initiate the account retrieval process. Account retrieval includes:
  Child information
  Products for purchase/content per parent consent
  Historical transactions performed by children
  KidsCash Purchase account balance
  KidsCash Savings account balance
  Allowance success requirements status
Parent User Data Retrieval The KidsCash Proprietary Transaction Server 303 accesses Database Server via secure connection and retrieves account information for parent user as shown by path 306. The KidsCash Proprietary Transaction Server accesses Database Server via secure connection and writes committed transaction data to the database (e.g., account replenishments).
Child User Data Retrieval For a child user, the KidsCash Proprietary Transaction Server 303 accesses Database Server via secure connection and retrieves:
  Account information for child user
  Filtered set of products for purchase
  User experience/content specific to child attributes (e.g. mascots, look and feel, navigation will be dynamically generated and personalized based on the child's age, gender, interests)
  COPPA embedded parental consent verification The KidsCash Proprietary Transaction Server accesses the Database Server via secure connection and writes committed transaction data to the database to provide:
  Order transactions
  Savings account transfer transactions
  Allowance success requirements progress updates
Parent User Account Data Presentation The KidsCash Proprietary Transaction Server 303 presents account data to Web Server via secure connection based on parent account attributes.
Child User Account Data Presentation For the child, the KidsCash Proprietary Transaction Server 303 presents account data, products for purchase, and personalized user experience attribute data to Web Server via secure connection based on child account attributes established by parent (mascots, look-and-feel will be dynamically generated and personalized based on the parent's preferences for each child).

Parent User Historical Data Requests

Following secure login by parent user, the Web Server 300 initiates communication to Database Server 311 along path 310 when parent user requests account historical transaction data including:

Pending and historical order transactions performed by children     Historical savings transactions performed by children     Status of pending order transactions performed by children     Replenishment transactions of each child's account balance via VISA/MC/checking account bank debits Child User Historical Data Requests Following secure login by child user, the Web Server initiates communication to Database Server 311 along path 310 when child user requests account historical transaction data including:

Pending and historical order transactions performed by children     Historical savings transactions performed     Status of pending order transactions     Replenishment transactions Additional Database Server Communications The Web Server 300 initiates communication to Database Server 311 via secure connection and writes committed transaction data to the database including account updates (rules, COPPA consent, privacy, child data, personal data, etc.) and allowance success requirements updates. The Web Server need not initiate communication to Database Server 311 for child users since the KidsCash Proprietary Transaction Server 303 will manage all data processing aspects of the child transaction and experience.

The Application Server 313 initiates communication to the Database Server 311 via secure connection 312 and will be used by KidsCash management and staff members to run applications and update data pertaining to KidsCash operations including:

Accounting

Customer relationship management

Financial reporting

Supplier purchasing reconciliation

Application Server 313 initiates communication to the Database Server 311 via secure connection 314 and will be used by KidsCash management and staff members to run applications that will update data pertaining to KidsCash retail products assortment including:

Product name and description

Product pricing

Product images

Product popularity

The Application Server 313 will create secure communication to the KidsCash external retail product suppliers' and retail product supplier aggregators' web-based application servers to perform the following:

For each order placed by a child, group order transaction lines by the appropriate suppliers based upon the product to be fulfilled     Prepare separate XML purchase transaction sets for each supplier     Communicate XML order transactions to product suppliers and retail product supplier aggregators for fulfillment Application Server will create secure communication to the KidsCash external retail product suppliers' and retail product supplier aggregators' web-based application servers 317 along path 316 to perform the following:

Allow KidsCash Merchandising Team to identify product assortments and download desired products which will define the KidsCash universe of products available for sale to children. Data files will be provided from each product supplier and retail product supplier aggregator containing:

Product name and description

Product pricing

Product images

Figure 4:
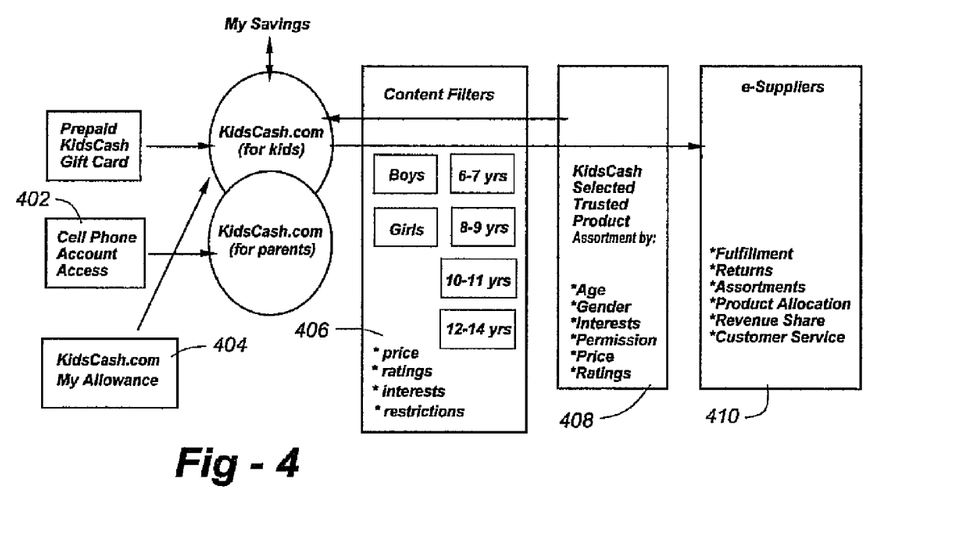
FIG. 4 is a simplified diagram showing system process flows.

Receive XML invoice transactions from product suppliers and retail product supplier aggregators based upon order transactions fulfilled by suppliers     Receive XML statements from product suppliers and retail product supplier aggregators The KidsCash Proprietary Transaction Server Application Server 303 also creates a secure communication at A to external bank partners' application server 320 to perform the following functions:

Request the creation of a new KidsCash Savings account by parent users     Establish a relationship between a child's KidsCash purchase account and the bank partner account designated as the child's KidsCash Savings account     Transfers of funds from a child's KidsCash account to their KidsCash Savings account     Transfers of funds from a child's KidsCash Savings account back to their KidsCash account     Facilitate required financial transaction audit trails KidsCash Proprietary Transaction Server Application Server 303 also creates a secure communication at B to external credit card processing application server 322 to perform the following:

Transfers of funds from a parent user's VISA/MC debit account back to their child's KidsCash Purchase account     Facilitate required financial transaction audit trails FIG. 4 is a simplified diagram showing system process flows. Cell phone access is provided via block 402, and "my allowance" is shown at 404. Various content filters are shown at 406. Among others, these include filters based upon gender, age group, price range, particular interests, movie/game ratings and other restrictions. These filters 406 may then be used to purchase goods through the various suppliers 410 through the portal 408.

Funds Remaining Icon

When a child registers for a new account on KidsCash.com, they may optionally be asked to select an icon that appeals to them (the default will be a piggy bank). The icon will be downloaded to their computer and be automatically placed into their Windows System Tray (or comparable Apple icon bar). The icon will then change color (e.g. green) from the feet on up to a level based on the amount of money in their KC account (like pouring green "liquid" into the top coin slot).

Following initial registration, the child can navigate to their KidsCash.com account directly by double clicking on their icon, and the web browser will automatically launch and they will be placed into their account screen with a dialog request to log in. Whenever the child's account gets "filled" with more money (i.e. the parent adds funds to their account, or a grandparent emails funds to their account), the icon will "jump" to a full size state on the computer screen and will: a) will fill up with more liquid, b) perform an animation (i.e. dance, fly around, etc.), c) make a funny sound (i.e. burp, laugh, scream, bodily function noise, etc.), and d) speak to the child via the speakers notifying them of the amount added to their account and who added it and when.

The full-size state of the icon will continue to loop through the animation, make the sound, and talk until the child has acknowledged that they received the message by clicking on the graphic. Once they click on the graphic, they will be presented with an email dialog box to type in a thank you back to the parent, relative, or individual that deposited the money into their account. Upon hitting "send" in this dialog, the application will automatically route the email through the KidsCash domain back to the individual.

Each child will have the ability to create, customize, and modify their personalized icon at any time from a library maintained on KidsCash including:

What character graphic to use
What to dress their character in
Animation to use
Sounds to use
Voice to use for hearing notifications
XM/Sirius Song List Additions Although the KidsCash system and method have been described in conjunction with "children" and "parents," it will be appreciated that adults alone may benefit from the environments. This is true of the following option, which applies to music, video, cable/satellite TV video and other media.

Many children ride in cars and vans with their parents and have access to XM and Sirius radio (e.g. private radio network service providers) in these vehicles. They listen to channels like Radio Disney, XM Kids, Sirius Hits 1, etc. When the child or parent hears a song that they like and want to buy with their KidsCash account at a later time, they press a predefined key sequence on the radio (determined via a SLA contract between KidsCash and Sirius or XM), the service provider immediately provides a sound "beep" sequence or a text message on the radio acknowledging the sequence has been pressed by the parent.

The key sequence, the exact time the sequence was entered, the channel number, and the radio ID is sent via satellite to the service provider (XM/Sirius). The song selection is identified based on the time the key sequence is initiated and the channel number. The service provider locates the subscriber's anonymous radio ID (e.g. the parent) and the attributes of the song selected (e.g. song name, artist name, album name, rating, length, etc.) and emails these data elements to a predefined KidsCash "Songs To Sell" email Inbox which resides on the secured KidsCash servers.

A KidsCash application reads each of the emails received in this "Songs To Sell" Inbox and then, using the radio ID, determine the parent associated with the radio, and thus, the KidsCash account for their child(s). Note that this requires that the parent simply add their XM or Sirius radio ID to their child's KidsCash account when set up in KidsCash. The attributes of the song are then added to the KidsCash account database and become visible only to that child when they next log in to their KidsCash account. This is presented to them as their "Wish List" of songs for future purchase consideration or for removal from the list by the child.

Depending on the music service the child is registered for from within KidsCash (e.g. iTunes, Sony, etc.), when the child selects that song to purchase with their KidsCash monies, Kidscash will initiate the purchase process with the music service just like all other purchases through KidsCash (safe, secure, not ever leaving the KidCash "world" website). The song purchase is then placed into the kid's music service (e.g. iTunes, Sony, etc.) library for use under their normal operating procedures. This concept may also be applied to bisynchronous (e.g. two-way communication) entertainment network service.

We claim:

1. A method enabling a child or young adult to shop on-line for goods or services in a safe and controlled manner, comprising the steps of:
    providing a web site with password-protected access;
    providing a first set of features enabling a parent or guardian to control or monitor any activity on the web site by a child or young adult, including the selection, purchase and receipt of products or services by the child or young adult;
    providing a second set of features specifically intended for use by the child or young adult in conjunction with the web site, the second set of features simplifying the accounting and funds management associated with purchasing products or services on the website;
    wherein the first set of features provide the following capabilities to the parent or guardian:
    accessing the web site to set up an account with a starting balance enabling a child or young adult to shop for products at the web site;
        prescreening products at the website to select trusted products appropriate for purchase by a child or young adult known to the parent or guardian, wherein the step of prescreening includes the use of content filters associated with age, gender and interests;
        purchasing a gift card storing a predetermined monetary value to be used only at the web site, and to purchase only the prescreened, trusted products selected by the parent or guardian using the content filters;
        notifying the parent or guardian that the child or young adult has ordered a product or service through the web site enabling the parent or guardian to monitor the receipt thereof; and
    wherein the second set of features provide the following capabilities to the child or young adult:
        shopping at the web site through a computer or portable electronic device using the gift card, with the purchase price of trusted products or services being in whole currency amounts including tax and shipping;
        reducing the account balance when the prescreened, trusted products are purchased; and
        displaying an animated desktop icon that graphically indicates the funds available to the child or young adult as goods or services are purchased or if the account receives additional funds.

2. The method of claim 1, including a content filter relating to price range.

3. The method of claim 1, including a content filter relating to a maturity rating.

4. The method of claim 1, including the step of retrieving consent information associated with the COPPA (Child Online Privacy Protection Act).

5. The method of claim 4, wherein the consent information includes usage options and opt-out provisions.

6. The method of claim 4, wherein the consent information includes child master records information.

7. The method of claim 1, including the step of allowing a third party other than the parent or guardian to fund the account.

8. The method of claim 1, wherein the starting balance is in a whole dollar amount.

9. The method of claim 1, further including the step of providing a desktop icon that allows access to the web site through a single click.

10. The method of claim 1, wherein the products for purchase include music, video, games or other media.

11. The method of claim 10, wherein the media are automatically placed into a music library for subsequent access by the purchaser.

12. The method of claim 1, wherein the products may be purchased through a satellite radio service.

13. The method of claim 1, wherein the products may be purchased through a predefined key sequence establishing a service-level agreement (SLA) contract.

14. The method of claim 13, wherein the SLA is established through the key sequence in conjunction with the time the sequence was entered, the channel number, and an identification code.

15. The method of claim 1, wherein the parent or guardian is notified via electronic mail that a product was purchased by the child or young adult.

16. The method of claim 1, including the step of funding the account of the child or young adult as a reward for chores completed or other positive behavior exhibited by the child or young adult.

* * * * *